United States Patent [19]

Samuelsson

[11] 4,113,987

[45] Sep. 12, 1978

[54] METHOD FOR IMPROVEMENT OF CROSSTALK ATTENUATION BETWEEN ADJACENT CHANNELS IN A TIME DIVISION MULTIPLEX SYSTEM

[75] Inventor: Kurt Anders Samuelsson, Tyresö, Sweden

[73] Assignee: Telefonaktiebolaget L M Ericsson, Stockholm, Sweden

[21] Appl. No.: 757,863

[22] Filed: Jan. 10, 1977

[30] Foreign Application Priority Data

Feb. 10, 1976 [SE] Sweden .............................. 7601451

[51] Int. Cl.² .............................................. H04J 3/10
[52] U.S. Cl. .............................................. 179/15 AN
[58] Field of Search .......... 179/15 AN, 15 AT, 78 R; 178/69 B

[56] References Cited

U.S. PATENT DOCUMENTS 3,891,806  6/1975  Chatelon ....................... 179/15 AN

FOREIGN PATENT DOCUMENTS 1,940,027  2/1970  Fed. Rep. of Germany ..... 179/15 AN

*Primary Examiner*—Kathleen H. Claffy
*Assistant Examiner*—Joseph A. Popek

*Attorney, Agent, or Firm*—Hane, Roberts, Spiecens & Cohen

[57] ABSTRACT

The invention concerns a method for improvement of the crosstalk attenuation between adjacent channels in a time division multiplex system, for example a PCM-system. The crosstalk will have contributions from both the transmitting and the receiving side of the system. The greatest part of the crosstalk arises during the sampling times in the transmitter and the receiver, due to residual charges from the sampling of the preceding channel. In order to carry out the method a modulo-2-adder is arranged in the coder or the decoder of the PCM-system. The modulo-2-adder is inserted in the connection associated with the polarity bit of the PCM-word between a series-parallel converter and a digital-analog-converter in the decoder, or between an analog-digital-converter and a parallel-series-converter in the coder, respectively. The adder also receives signals from a clock oscillator with half the word frequency. Through such arrangement the polarity bits of the PCM-words are inverted in every second channel, so that the phase-position of the decoded signal will change, whereby crosstalk signals originating from signals in adjacent channels will be neutralized.

2 Claims, 10 Drawing Figures

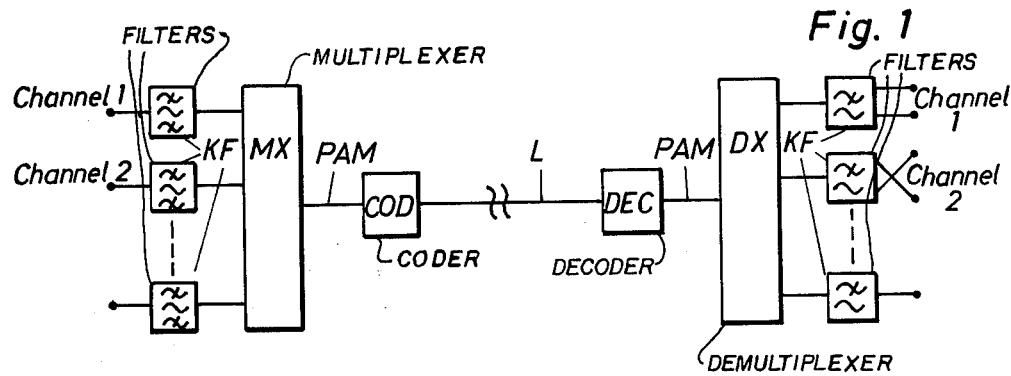
Fig. 1
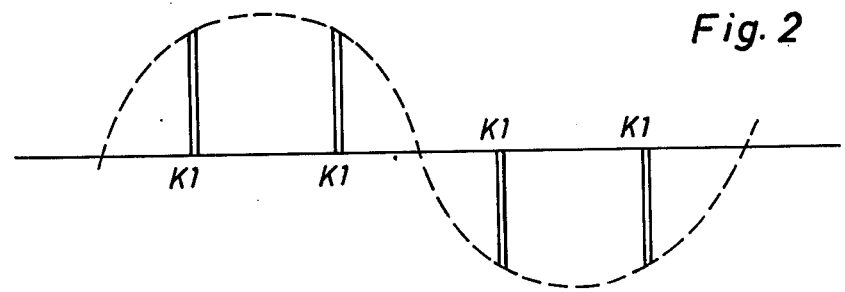
Fig. 2
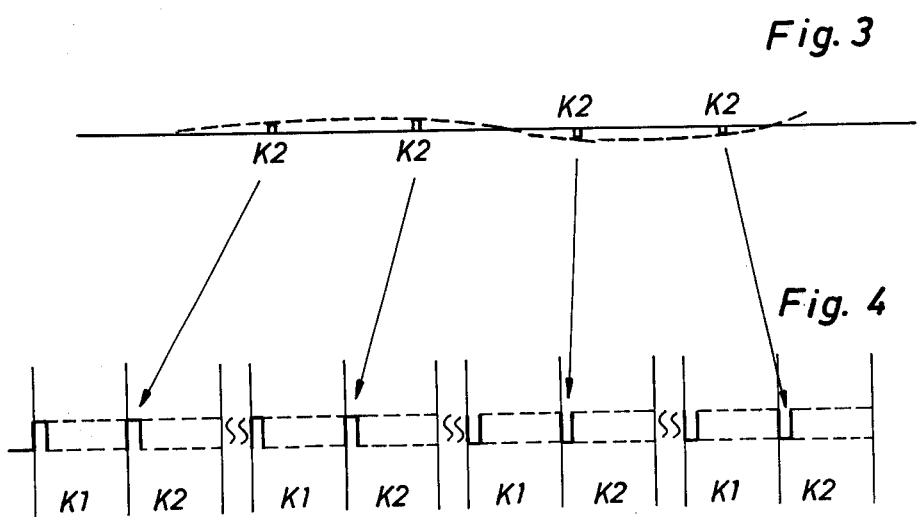
Fig. 3
Fig. 4

METHOD FOR IMPROVEMENT OF CROSSTALK ATTENUATION BETWEEN ADJACENT CHANNELS IN A TIME DIVISION MULTIPLEX SYSTEM

The invention refers to a method for the improvement of crosstalk attenuation between adjacent channels in a time division multiplex system, for example a PCM-system.

In transmission systems of the TDM-type (time division multiplex) crosstalk arises between adjacent channels on the sender side as well as on the receiver side as a result of imbalances in the channel filters and as a result of residual charges which arise from the sampling of the preceding channel.

An earlier known method for the improvement of crosstalk attenuation consists in adding a signal to the pulse amplitude modulated (PAM) signal on the sender side of the system, where the frequency of the added signal, for example 4 kHz, is located outside the frequency of the transferred speech band. Such added signal influences the coding of the crosstalk signal in such a manner that the frequency of the crosstalk signal is camouflaged, since a combination of the frequencies of the two signals is coded. The drawbacks with this method is that it requires an adaptation of the level of the added signal and that it also deteriorates the crosstalk attenuation in channels where it was previously satisfactory.

The invention solves these problems and is characterized in accordance with the appended claims.

The invention is described more in detail by means of an embodiment and with reference to the accompanying drawing where:

FIG. 1 shows a block diagram of a PCM-system;

FIG. 2 shows the PAM-signal in a channel on the sender side;

FIG. 3 shows the crosstalk in an adjacent channel on the sender side;

FIG. 4 shows the sampled signals according to FIGS. 2 and 3, in coded form;

With reference to FIG. 1 the problem may be described in the following manner.

When transferring a signal in an arbitrary channel in the PCM-system the signal reaches in an ordinary manner the output on corresponding channel in the receiver via a channel filter KF on the sender side, a multiplexer MX, a coder COD, a line L, a decoder DEC, a demultiplexer DX and a channel filter KF on the receiver side. The same signal is also received in the adjacent channel on the receiver side, but with a lower level than the signal received in the first mentioned channel. This crosstalk signal which is received in the adjacent channel may be more or less attenuated. Crosstalk contribution is obtained from both the sender side and the receiver side of the system. As mentioned above crosstalk between adjacent channels on both the sender side and the receiver side will be obtained due to an imbalance in the channel filters and due to residual charges originating from the sampling of the preceding channel. The analog signal is sampled thus producing a PAM-signal, which is supplied to an analog-digital-converter after which the signal is supplied to a parallel-series-converter in a coder COD in which the signal also is quantified and converted into binary PCM-words.

FIG. 2 shows the pulse amplitude modulated signal in, for example, channel 1. According to FIG. 3 a crosstalk signal then appears in channel 2. FIG. 4 shows the coded signal corresponding to the 8 samples in FIGS. 2 and 3. The most significant bit in a PCM-word is the polarity bit which is defined by the polarity of the sample. It is obvious that the polarity bit is also generated for low amplitude values of the crosstalk signal. According to FIG. 1 the PCM-words on the receiver side are fed to a series-parallel-converter and from there to a digital-analogue-converter in a decoder DEC which converts the PCM-words into analog signals.

The crosstalk contribution from the receiver side mainly arises in the analogue parts of the decoder and in the channel filters. This crosstalk is capacitive, i.e. a positive signal in channel 1 produces a positive crosstalk signal in channel 2. Since the crosstalk contributions from the sender side and the receiver side of the system both are positive, i.e. are in phase with the ground signal, the total crosstalk is the sum of all such contributions.

Figure 5:
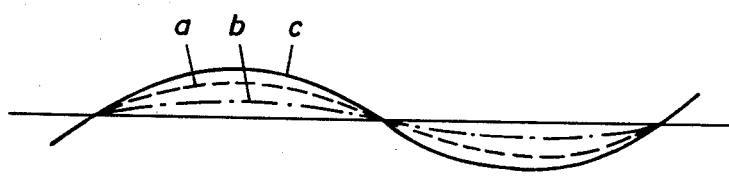
FIG. 5 shows the crosstalk on the receiver side in shape of a curve without using the principle of the invention.

FIG. 5 shows the total crosstalk on the output of the channel filter belonging to channel 2 on the receiver side. The dashed curve a constitutes the contribution from the sender side, the dot-dash curve b constitutes the contribution from the receiver side and the drawn curve c constitutes the sum of the crosstalk contributions, i.e. $c = a + b$.

The representation which has been chosen for the polarity bit in the PCM-word, i.e. to let a positive sample correspond to a high level, a one on the polarity bit, is changed according to the invention in order to obtain a neutralization of the crosstalk.

In, for example, each odd channel a positive sample may be represented by a one for the polarity bit, in each even channel, however, a negative sample may represent a one for the polarity bit. Thus an inversion of the polarity of the signals takes place in the even channels. This procedure will result in the crosstalk signal on the receiver side, which earlier was in phase with the signal obtained during the decoding of the polarity bit in the crosstalk signal from the sender side, now will work in antiphase with such signal, an reduction of the crosstalk is obtained.

Figure 6:
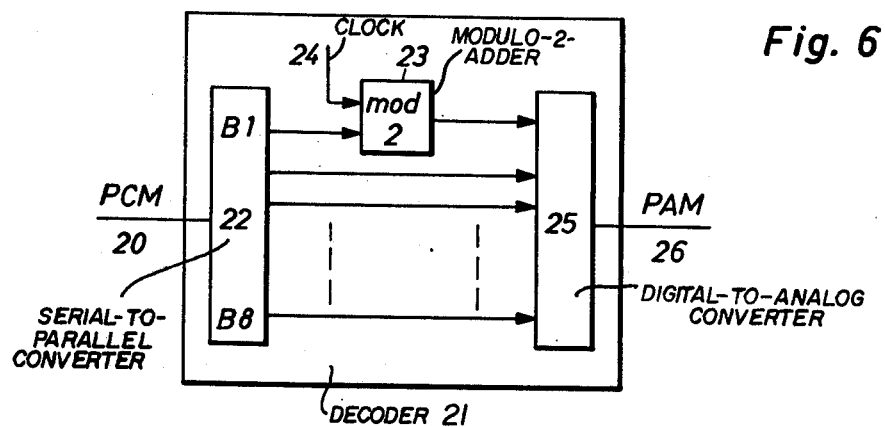
FIG. 6 shows the decoder with an arrangement according to the invention.

In order to carry out the inversion of the polarity bit according to the example a modulo-2-adder is connected to the decoder on the receiver side of the system as shown in FIG. 6. The PCM-words are supplied to the input 20 of the decoder 21. After conversion in a series-parallel-converter 22 the PCM-word appears, for the case when it contains eight bits, on eight parallel outputs on the converter 22, each output representing a bit in the PCM-word. That output, B1, which represents the polarity bit in the PCM-word is supplied to one of the inputs of a modulo-2-adder 23 to whose second input 24 a signal from a timing device or clock is connected. The timing device emits pulses or binary ones with intervals which correspond to half the word frequency. The timing device in known manner takes the word pulses associated with every PCM system and binary counts these word pulses to give one pulse for each two received word pulses. The output from the modulo-2-adder is a logical zero if the input signals are equal and a logical one if they are different. If the polarity bit which coincides with the timing pulse is a one, a logical zero is obtained on the output of the modulo-2-adder, the polarity bit has consequently been inverted. If the polarity bit is a zero the modulo-2-adder obtains a one on the output. By chosing the pulse interval of the timing device in such manner the polarity bit is inverted in every other PCM-word. The bits in the PCM-words are supplied to the inputs on a digital-analog-converter 25, on the output 26 of which the pulse amplitude modulated signal is restored.

Figure 7:
FIGS. 7-9 show examples of signals to and from a modulo-2-adder which is used in the invention.
Figure 8:
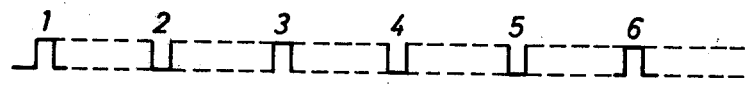
Figure 9:
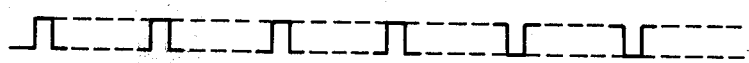

FIGS. 7-9 show examples on signals to and from the modulo-2-adder, FIG. 7 showing the timing signal or clock pulse, FIG. 8 showing the polarity bits of the serially received PCM-words, and FIG. 9 showing the polarity bit on the output of the modulo-2-adder. As appears from these Figures every other polarity bit is inverted.

Figure 10:
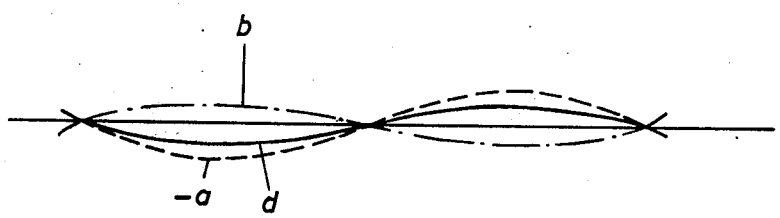
FIG. 10 shows the crosstalk on the receiver side when utilizing the principle of the invention.

FIG. 10 shows the resulting crosstalk $d$ which is obtained by utilizing the invention. With $-a$ is designated the crosstalk signal obtained by the inversion of the polarity bit which signal corresponds to the signal $a$ in FIG. 5. The resulting crosstalk $d$ constitutes the difference between the inverted contribution $-a$ from the sender side and the unchanged contribution $b$ from the receiver side, which gives $d = a + b$. The crosstalk contribution $b$ is unchanged also after using the invention. Since the signals $a$ and $b$ in FIG. 5 are in phase, the following statement is obtained $|d| \leq |c|$. As appears from FIG. 10, the resulting crosstalk is lower than before using the invention and the crosstalk attenuation increases.

Since the output signal, from the PCM-system shown in the example, shall be an exact reproduction of the signal fed to the system, the output wires of the system must be polarity reversed in those channels where polarity inversion has been carried out.

It is also possible to carry out the inversion of the polarity bit on the sender side of the system. The modulo-2-adder is then arranged in the coder instead of the decoder.

The inversion of the value of the polarity bit can of course also be carried out in the odd channels of the system, the main thing is that the polarity bit in every other channel is inverted.

The method consequently improves the crosstalk attenuation between adjacent channels without influencing channels where the crosstalk attenuation already is satisfactory.

We claim:

1. Method for reducing crosstalk between adjacent channels in a time division multiplex system which transmits code words each including at least one polarity bit and a plurality of amplitude-representing bits, comprising the steps of changing, on the sender side, analog signals to sets of parallel digital signals, each set having a polarity bit and a plurality of amplitude-representing bits, converting the sets of parallel digital signals to sets of serial digital signals, transmitting sequentially the sets of serial digital signals, converting, at the receiver side, the sets of serial digital signals to sets of parallel digital signals, changing the sets of parallel digital signals to analog signals, and inverting the polarity bit and maintaining the amplitude-representing bits in every other set during at least one of said converting steps.

2. In a time division multiplex system, in the form of a PCM-system, which transmits code words each including at least one polarity bit and a plurality of amplitude-representing bits, said PCM-system having on the sender side, signal converting means for converting analog signals into digital signals and on the receiver side, converting means for converting digital signals into analog signals, the converting means on the sender side having an analog/digital converter, a parallel/series converter and parallel connections each corresponding to a bit in a code word being arranged from the outputs of said analog/digital converter to the inputs of said parallel/series converter, the converting means on the receiver side having a series/parallel converter, a digital/analog converter and parallel connections each corresponding to a bit in a code word being arranged from the outputs of said series/parallel converter to the inputs of said digital/analog converter, apparatus for reducing crosstalk between adjacent channels in the time-division multiplex comprising a two-input one-output modulo-2-adder, disposed in the path of the parallel connection belonging to the polarity bit of the code word in at least one of the converting means, whereby one input of the adder receives the polarity bits, and timer means for generating pulses of half the word frequency and connected to the other input of the adder so as to invert the polarity bit in every other code word at the output of the adder.

* * * * *